United States Patent
Takahashi

(10) Patent No.: US 8,175,334 B2
(45) Date of Patent: May 8, 2012

(54) VEHICLE ENVIRONMENT RECOGNITION APPARATUS AND PRECEDING-VEHICLE FOLLOW-UP CONTROL SYSTEM

(75) Inventor: Yasushi Takahashi, Tokyo (JP)

(73) Assignee: Fuji Jukogyo Kabushiki Kaisha, Tokyo (JP)

(*) Notice: Subject to any disclaimer, the term of this patent is extended or adjusted under 35 U.S.C. 154(b) by 651 days.

(21) Appl. No.: 12/382,826

(22) Filed: Mar. 24, 2009

(65) Prior Publication Data

US 2009/0243823 A1 Oct. 1, 2009

(30) Foreign Application Priority Data

Mar. 27, 2008 (JP) .................................. 2008-083716

(51) Int. Cl.
*G06K 9/00* (2006.01)
*H04N 7/18* (2006.01)
*G08G 1/01* (2006.01)
*G05D 1/00* (2006.01)

(52) U.S. Cl. ............. 382/103; 348/148; 340/933; 701/1

(58) Field of Classification Search .................. 382/103, 382/104, 154; 348/47, 143, 148; 340/435, 340/933, 937, 938, 939; 701/41, 200, 300; 180/170

See application file for complete search history.

(56) References Cited

U.S. PATENT DOCUMENTS

| | | | | |
|---|---|---|---|---|
| 5,901,806 A * | 5/1999 | Takahashi | ..................... | 180/170 |
| 6,166,764 A * | 12/2000 | Sakata | .......................... | 348/148 |
| 6,476,855 B1 * | 11/2002 | Yamamoto | .................... | 348/148 |
| 6,756,916 B2 * | 6/2004 | Yanai | ............................. | 340/936 |
| 6,944,538 B2 * | 9/2005 | Ishibashi et al. | ............... | 701/423 |
| 7,433,769 B2 * | 10/2008 | Tange et al. | ...................... | 701/41 |
| 7,436,982 B2 * | 10/2008 | Taniguchi et al. | ............ | 382/104 |
| 7,948,517 B2 * | 5/2011 | Asai | ............................... | 348/143 |
| 7,983,447 B2 * | 7/2011 | Higuchi et al. | ............... | 382/103 |
| 2002/0018119 A1 | 2/2002 | Kogure et al. | | |

FOREIGN PATENT DOCUMENTS

| | | |
|---|---|---|
| JP | 5-114099 | 5/1993 |
| JP | 5-265547 | 10/1993 |
| JP | 6-266828 | 9/1994 |
| JP | 10-283461 | 10/1998 |
| JP | 10-283477 | 10/1998 |
| JP | 2000-207563 | 7/2000 |
| JP | 2001-28745 | 1/2001 |
| JP | 2001-43377 | 2/2001 |
| JP | 2002-22439 | 1/2002 |
| JP | 2006-72495 | 3/2006 |

* cited by examiner

*Primary Examiner* — Kanjibhai Patel
(74) *Attorney, Agent, or Firm* — Smith, Gambrell & Russell, LLP

(57) ABSTRACT

A vehicle environment recognition apparatus includes stereo-image taking means for outputting a reference image of the surroundings of a subject vehicle, stereo matching means for correlating a parallax with each pixel block in the reference image by stereo matching, preceding-vehicle detecting means for detecting a preceding vehicle from the reference image on the basis of the parallax or the like, and smear determining means for searching a pixel column vertically extending in the reference image for brightnesses of pixels, the pixel column including a pixel block having a parallax less than or equal to a long-distance parallax threshold value corresponding to the long distance including infinity, and determining that a smear occurs when a ratio of the number of pixels having brightnesses more than or equal to a predetermined brightness to the total number of pixels in the pixel column is more than or equal to a predetermined ratio.

8 Claims, 10 Drawing Sheets

VEHICLE ENVIRONMENT RECOGNITION APPARATUS AND PRECEDING-VEHICLE FOLLOW-UP CONTROL SYSTEM

CROSS-REFERENCE TO RELATED APPLICATION

The disclosure of Japanese Patent Application No. 2008-083716 filed on Mar. 27, 2008 including the specification, drawings and abstract is incorporated herein by reference in its entirety.

BACKGROUND OF THE INVENTION

1. Field of the Invention

The present invention relates to a vehicle environment recognition apparatus and a preceding-vehicle follow-up control system, and more particularly, to a vehicle environment recognition apparatus that recognizes a surrounding environment by stereo matching of a pair of images taken by a stereo-image taking means, and a preceding-vehicle follow-up control system including the vehicle environment recognition apparatus.

2. Description of the Related Art

In recent years, adaptive cruise control (hereinafter abbreviated as ACC) systems having a preceding-vehicle follow-up function have been developed. An ACC system recognizes an environment in front of and around a subject vehicle (a vehicle in which the system is mounted) and a preceding vehicle by processing a pair of images taken by a stereo-image taking means formed by a stereo camera, and performs follow-up running control with respect to the preceding vehicle on the basis of the recognition result.

When there is no preceding vehicle, the ACC system causes the subject vehicle to run at a set constant speed. In contrast, when there is a preceding vehicle, the ACC system automatically and properly controls an accelerator throttle and a brake mechanism of the subject vehicle so that the subject vehicle follows the preceding vehicle. To this end, the ACC system is required to accurately detect the preceding vehicle.

For example, when an image is taken by a CCD (charge coupled device) image sensor serving as the stereo-image taking means in a backlit environment, a linear smear that is extremely brighter than the surroundings (also referred to as an overexposed portion) sometimes appears in the image in a manner such as to extend vertically. FIG. 15 shows an example of an image taken at a high attitude. In the image, a portion corresponding to the sun Su setting near the top of a small mountain M is extremely bright (even the outline of the sun Su is not shown because of intense flare (halation)). This causes a significantly large smear Sm below the sun Su in the image.

In this condition, stereo matching cannot be properly conducted on a pair of images taken by the stereo-image taking means, and a preceding vehicle Vah cannot be detected (that is, is lost), or a wrong distance that is different from the actual distance is detected by stereo matching. If the ACC system continues operation in a state in which the preceding vehicle Vah is lost or the distance to the preceding vehicle Vah is erroneously detected, a seriously dangerous situation occurs, for example, the subject vehicle comes close to and collides with the preceding vehicle Vah.

To avoid this situation, first, it is necessary to reliably determine whether or not there is a smear in the image. Accordingly, apparatuses that monitor brightnesses of all pixels in a taken image or brightnesses of pixels in a monitor region set in the image, and determine that a smear occurs when any of the pixels has a saturated or nearly saturated brightness have been developed (for example, see Japanese Unexamined Patent Application Publication Nos. 2000-207563, 2001-28745, 2001-43377, and 2002-22439).

Unfortunately, in a case in which only the brightnesses of pixels in the entire image or in the monitor region of the image are monitored, for example, when an image portion of a columnar object that glistens white because of reflection of the sunlight extends through the image from top to bottom, it may be erroneously detected that there is a smear. This may cause the ACC system to malfunction.

Even when only the monitor region in the image, not the entire image, is searched, much time is taken to constantly monitor the brightnesses of all pixels in the monitor region. Therefore, the processing time and the burden on the processing device are increased.

SUMMARY OF THE INVENTION

The present invention has been made in view of these circumstances, and an object of the invention is to provide a vehicle environment recognition apparatus that can easily and reliably determine whether or not a smear occurs in a pair of images output from a stereo-image taking means. Another object of the invention is to provide a preceding-vehicle follow-up control system that can properly cope with a situation in which a smear occurs.

In order to solve the above-described problems, a vehicle environment recognition apparatus according to an aspect of the present invention includes stereo-image taking means for taking and outputting a reference image and a comparative image of a surrounding environment of a subject vehicle with a pair of cameras; stereo matching means for dividing the reference image into pixel blocks each having a predetermined number of pixels, subjecting each of the pixel blocks to stereo matching with the comparative image, and correlating a calculated parallax or distance with the pixel block in the reference image; preceding-vehicle detecting means for detecting a preceding vehicle from the reference image on the basis of the parallax or distance calculated by the stereo matching means; and smear determining means for searching a pixel column vertically extending in the reference image for brightnesses of pixels, the pixel column including a pixel block having, as the distance, a distance more than or equal to a long distance threshold value including infinity or having, as the parallax, a parallax less than or equal to a long-distance parallax threshold value corresponding to the long distance threshold value, and for determining that a smear occurs when a ratio of the number of pixels having brightnesses more than or equal to a predetermined brightness to the total number of pixels belonging to the pixel column is more than or equal to a predetermined ratio.

In this case, the smear determining means determines, by stereo matching, whether or not a smear occurs in a pixel column that vertically extends in the reference image and that includes a pixel block having, as the distance, a distance more than or equal to the long distance threshold value including infinity or having, as the parallax, a parallax less than or equal to the long-distance parallax threshold value corresponding to the long distance threshold value. For this reason, for example, when an image portion of a columnar object that glistens white because of reflection of the sunlight extends through the image from top to bottom, a parallax or distance corresponding to a long distance including infinity is not calculated for the object by stereo matching. Therefore, the smear determining means can reliably prevent this object from being erroneously judged as a smear, and can reliably determine the occurrence of a smear.

Since a smear is characterized in extending from top to bottom of one or a plurality of pixel columns vertically extending in the image, the occurrence of a smear can be sufficiently reliably determined by determining whether or not a smear occurs in the pixel column that vertically extends in the reference image and that includes a pixel block having a calculated value corresponding to the long distance including infinity.

Further, the smear determining means determines the occurrence of a smear only when a value corresponding to the long distance including infinity is calculated as the parallax or distance of the pixel block by stereo matching. Moreover, the smear determining means searches only a pixel column including the pixel block in the reference image for brightnesses of pixels. For this reason, compared with a case in which the entire reference image or the monitor region in the reference image is always searched, the burden on the operation of determining the occurrence of a smear is considerably reduced, and the operation is simplified. Moreover, the operation time can be reduced.

Preferably, when the pixel column includes a plurality of pixel columns vertically extending in the reference image and each having a width corresponding to one pixel, the smear determining means conducts the search on each of the pixel columns. The smear determining means determines that a smear occurs when the ratio of the number of pixels having brightnesses more than or equal to the predetermined brightness in at least one of the pixel columns to the total number of pixels belonging to the pixel column is more than or equal to the predetermined ratio.

With the above-described characteristics of the smear, in a case in which the pixel column that vertically extends in the reference image and that is searched for brightnesses of pixels includes a plurality of pixel columns each having a width corresponding to one pixel, when at least one of the pixel columns satisfies the above condition, it can be said that a smear occurs. Therefore, the above-described advantage of the present invention is more reliably achieved by searching each of the pixel columns and determining that a smear occurs when at least one of the pixel columns satisfies the above condition.

Preferably, during the search, the smear determining means searches a predetermined number of pixels upward from the lowermost pixel of the pixel column in the reference image for the brightnesses of the pixels, and determines that a smear occurs when the ratio of the number of pixels having brightnesses more than or equal to the predetermined brightness to the predetermined number of pixels is more than or equal to a predetermined ratio.

In an upper portion of the reference image or the comparative image, an image of an object present higher than a vehicle in front of the subject vehicle is included. Therefore, even when a smear does not occur, a value corresponding to the long distance including infinity is sometimes calculated as a parallax or distance by stereo matching in a reference pixel block in the upper portion of the reference image. On the other hand, a smear is characterized in extending through the image from top to bottom, as described above. For this reason, the adverse effect of the upper portion of the reference image can be avoided and the above-described advantages of the present invention can be more reliably achieved by searching the reference image except the upper portion.

Preferably, the preceding-vehicle detecting means divides, into a plurality of vertical sections, the reference image in which the parallax or the distance is correlated with each of the pixel blocks by the stereo matching means, forms a histogram for each of the sections, extracts a typical parallax or a typical distance by entering the parallaxes or the distances of the pixel blocks belonging to the section into the histogram, and detects the preceding vehicle on the basis of the typical parallax or the typical distance of the section. Preferably, the smear determining means monitors a result of entry into the histogram of each of the sections, and conducts the search on a section in which the number of entered distances more than or equal to the long distance threshold value or parallaxes less than or equal to the long-distance parallax threshold value is more than or equal to a predetermined threshold value in the histogram.

In this case, the smear determining means monitors a state the preceding-vehicle detecting means enters information about the parallaxes or distances into the histogram of each section, and conducts the search on only the section in which the number of entered distances or parallaxes corresponding to the long distance including infinity is more than or equal to the predetermined threshold value in the histogram. This allows the above-described advantages of the present invention to be achieved more effectively.

A preceding-vehicle follow-up control system according to another aspect of the present invention includes any of the above-described vehicle environment recognition apparatuses; and a preceding-vehicle follow-up control apparatus that performs preceding-vehicle follow-up control over the subject vehicle on the basis of information about the preceding vehicle detected by the preceding-vehicle detecting means. The preceding-vehicle follow-up control apparatus halts the preceding-vehicle follow-up control over the subject vehicle when the smear determining means in the vehicle environment recognition apparatus determines that a smear occurs.

In this case, since the smear determining means in the vehicle environment recognition apparatus reliably determines whether or not a smear occurs, the preceding-vehicle follow-up control apparatus in the preceding-vehicle follow-up control system can properly halt the preceding-vehicle follow-up control on the basis of the determination when a smear occurs. Therefore, it is possible to properly cope with the occurrence of a smear.

Preferably, the preceding-vehicle follow-up control apparatus halts the preceding-vehicle follow-up control over the subject vehicle when the smear determining means determines that smears occur in a predetermined number of continuous frames.

In this case, when it is determined that smears occur in a predetermined number of continuous frames, the preceding-vehicle follow-up control over the subject vehicle is halted. Therefore, even if the smear determining means in the vehicle environment recognition apparatus erroneously determines the occurrence of a smear, it is possible to halt the preceding-vehicle follow-up control over the subject vehicle after sufficiently checking the determination of the smear determining means. This allows the above-described advantages of the present invention to be achieved more reliably.

Preferably, the preceding-vehicle follow-up control apparatus includes a counter that increases the count number in a frame that is judged as including a smear by the smear determining means and decreases the count number in a frame that is not judged as including a smear by the smear determining means. The preceding-vehicle follow-up control apparatus halts the preceding-vehicle follow-up control over the subject vehicle when the count number of the counter is more than or equal to a predetermined threshold value.

In this case, when the count number is increased or decreased and becomes more than or equal to the predetermined threshold value, the preceding-vehicle follow-up control over the subject vehicle is halted. Therefore, even if the smear determining means in the vehicle environment recognition apparatus erroneously determines the occurrence of a smear, it is possible to halt the preceding-vehicle follow-up control over the subject vehicle after sufficiently checking the determination of the smear determining means. This allows the above-described advantages of the present invention to be achieved more reliably.

Preferably, when the preceding-vehicle follow-up control over the subject vehicle is halted, the preceding-vehicle follow-up control apparatus warns a driver of the subject vehicle that the preceding-vehicle follow-up control is halted.

In addition to the above-described advantages of the present invention, if the driver of the subject vehicle does not notice that preceding-vehicle follow-up control is halted, the driver falsely believes that preceding-vehicle follow-up control is continued and fails to perform braking. This may cause a collision with the preceding vehicle. When the preceding-vehicle follow-up control over the subject vehicle is halted, the control means in the preceding-vehicle follow-up control apparatus warns the driver that preceding-vehicle follow-up control is halted, for example, by emitting sound, displaying a message on a screen, or lighting a lamp. This can attract the driver's attention, and can avoid the above-described situation.

DESCRIPTION OF THE PREFERRED EMBODIMENT

A vehicle environment recognition apparatus and a preceding-vehicle follow-up control system according to an embodiment of the present invention will be described below with reference to the drawings.

Vehicle Environment Recognition Apparatus

Figure 1:
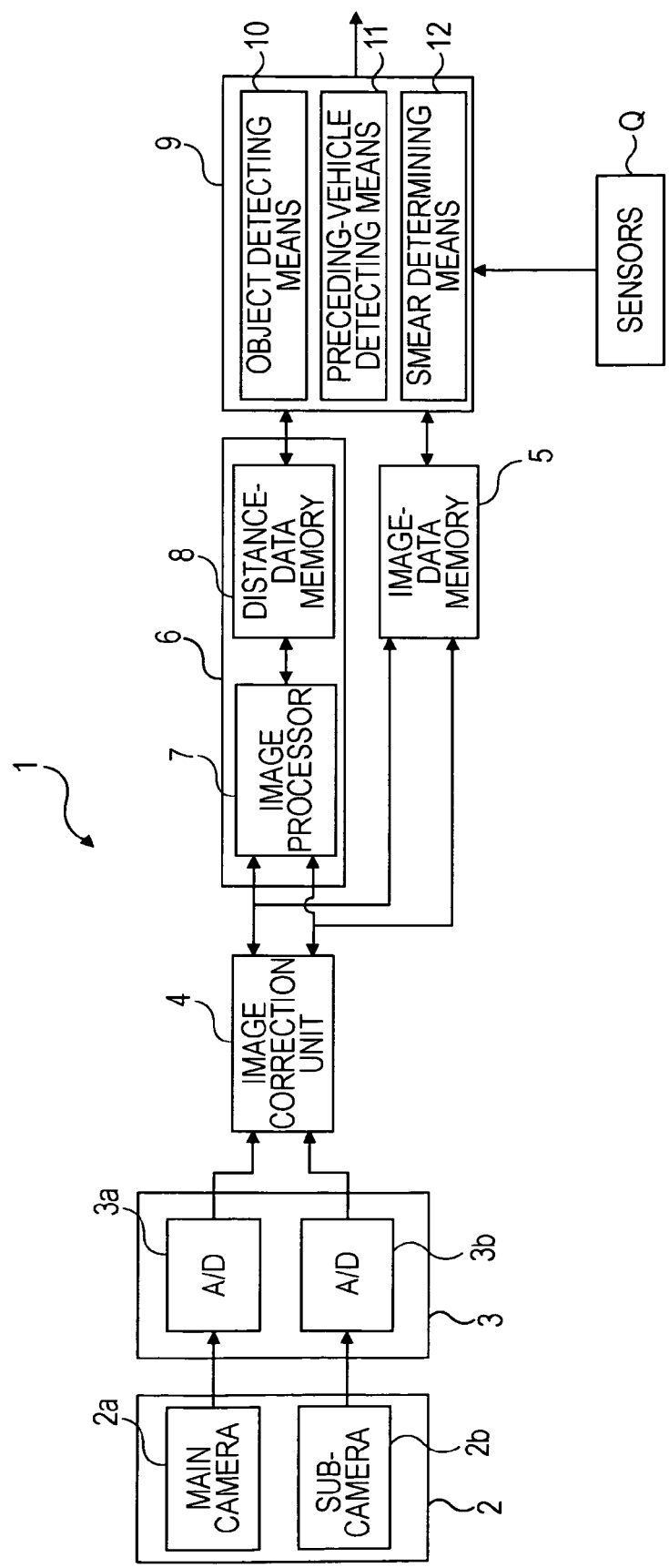
FIG. 1 is a block diagram showing a configuration of a vehicle environment recognition apparatus according to an embodiment.

Referring to FIG. 1, a vehicle environment recognition apparatus 1 according to this embodiment mainly includes a stereo-image taking means 2, a stereo matching means 6, and a processing means 9.

In this embodiment, the structures from the stereo-image taking means 2 to the stereo matching means 6 are based on the vehicle surroundings monitoring apparatus and so on disclosed in Japanese Unexamined Patent Application Publication Nos. 5-114099, 5-265547, 6-266828, 10-283461, 10-283477, and 2006-72495 filed earlier by the present applicant. Therefore, the structures will be briefly described below.

The stereo-image taking means 2 includes a main camera 2a and a sub-camera 2b serving as a pair of image taking means that are spaced a fixed distance apart in the vehicle width direction. The stereo-image taking means 2 takes a pair of images (a reference image and a comparative image) of an environment around a subject vehicle. In this embodiment, stereo cameras including CCD image sensors that are in synchronization with each other are used as the stereo-image taking means 2.

A pair of images taken and output by the stereo-image taking means 2 are converted from analog images into digital images, in which each pixel has a brightness at a predetermined number of, for example, 0 to 255 levels of gray scale, by A/D converters 3a and 3b in the conversion means 3, and are subjected to image correction, such as removal of displacement and noise and correction of the brightness, by an image correction unit 4. The corrected digital images are stored in an image-data memory 5 and are transmitted to the processing unit 9.

After image correction, the taken images are also transmitted to the stereo matching means 6. The stereo matching means 6 includes an image processor 7 and a distance-data memory 8, and performs stereo matching.

Figure 2:
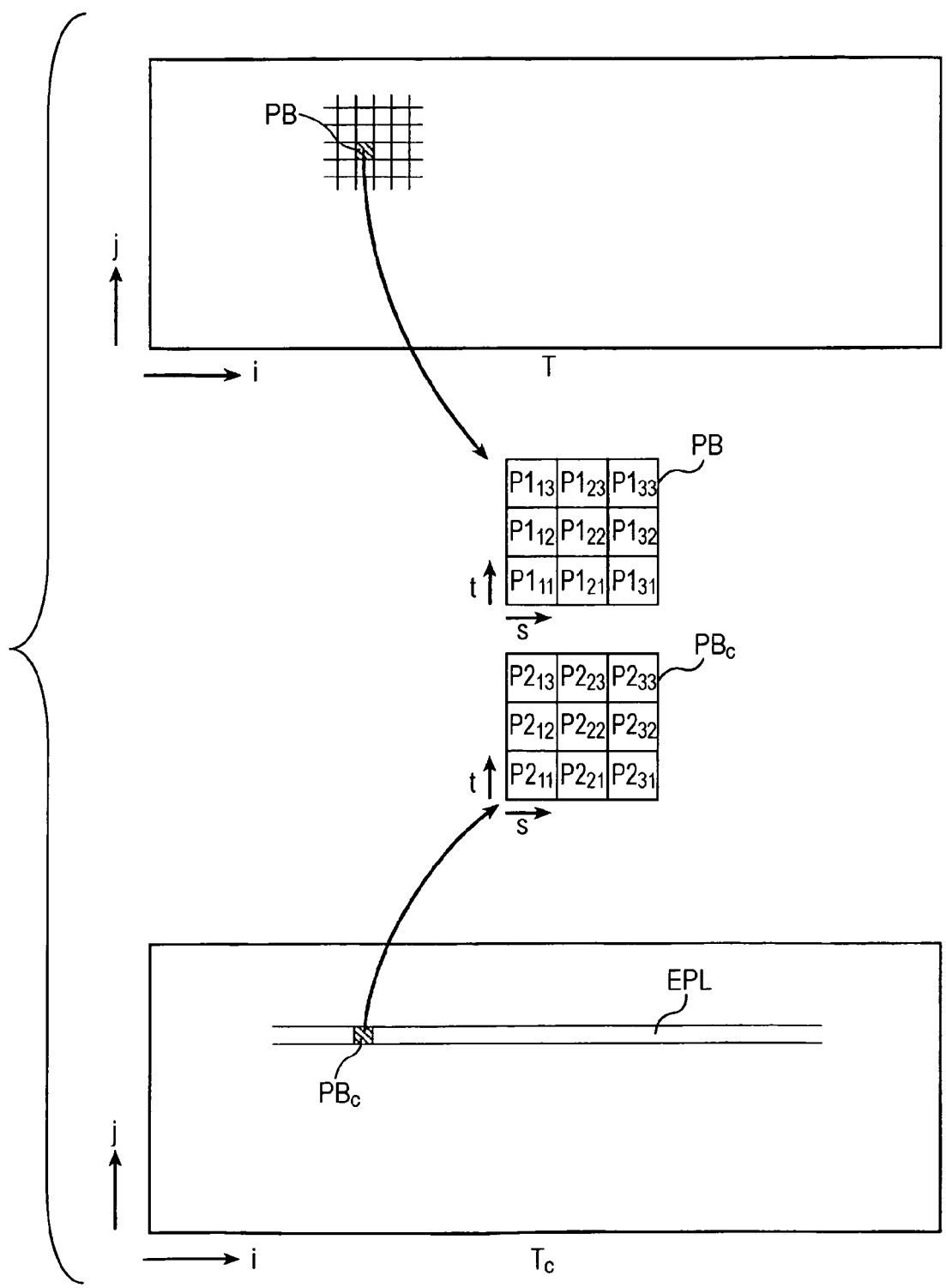
FIG. 2 illustrates a stereo matching method adopted in an image processor.

Specifically, as shown in FIG. 2, the image processor 7 sets a reference pixel block PB defined by a predetermined number of pixels, such as 3 by 3 pixels or 4 by 4 pixels, in a reference image T. Then, the image processor 7 calculates SAD values serving as differences in brightness pattern between the reference pixel block PB and comparative pixel blocks $PB_c$ having the same shape as that of the reference pixel block PB and present on an epipolar line EPL in a comparative image $T_c$ corresponding to the reference pixel block PB according to the following Expression (1), and specifies a comparative pixel block $PB_c$ having the smallest SAD value:

$$SAD = \sum_{s,t} |p1st - p2st| \qquad (1)$$

where $p1st$ represents the sum of brightnesses of pixels in the reference pixel block PB, and $p2st$ represents the sum of brightnesses of pixels in the comparative pixel block $PB_c$. The sums are calculated for all pixels in the ranges where $1 \leq s \leq 3$ and $1 \leq t \leq 3$ when each of the reference pixel block PB and the comparative pixel block $PB_c$ is set as a region defined by 3 by 3 pixels, and for all pixels in the ranges where $1 \leq s \leq 4$ and $1 \leq t \leq 4$ when each of the reference pixel block PB and the comparative pixel block $PB_c$ is set as a region defined by 4 by 4 pixels.

Figure 3:
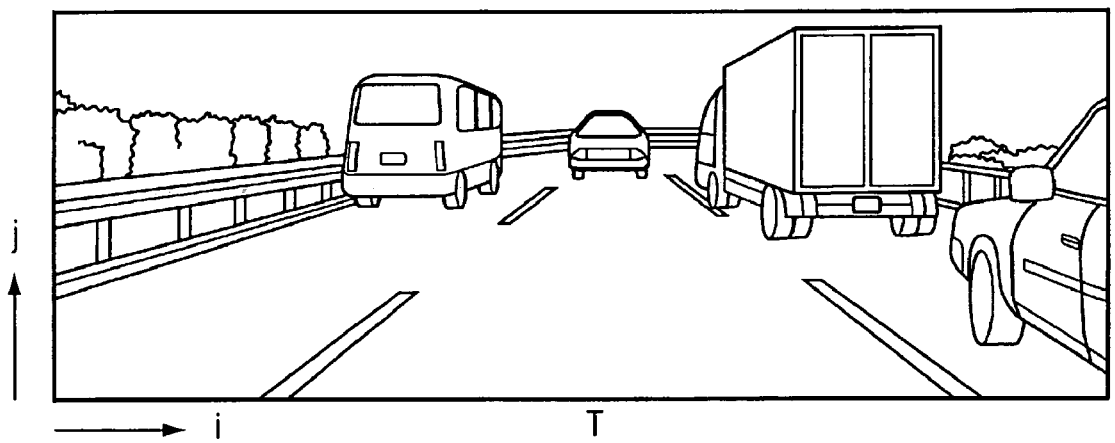
FIG. 3 shows an example of a reference image.

The image processor 7 calculates a parallax dp for each reference pixel block PB in the reference image T from the position of the specified comparative pixel block $PB_c$ in the comparative image Tc and the position of the reference pixel block PB in the reference image T. In this embodiment, the image processor 7 respectively correlates the above-described calculated parallaxes dp with the reference pixel blocks PB in the reference image T shown in FIG. 3.

Figure 4:
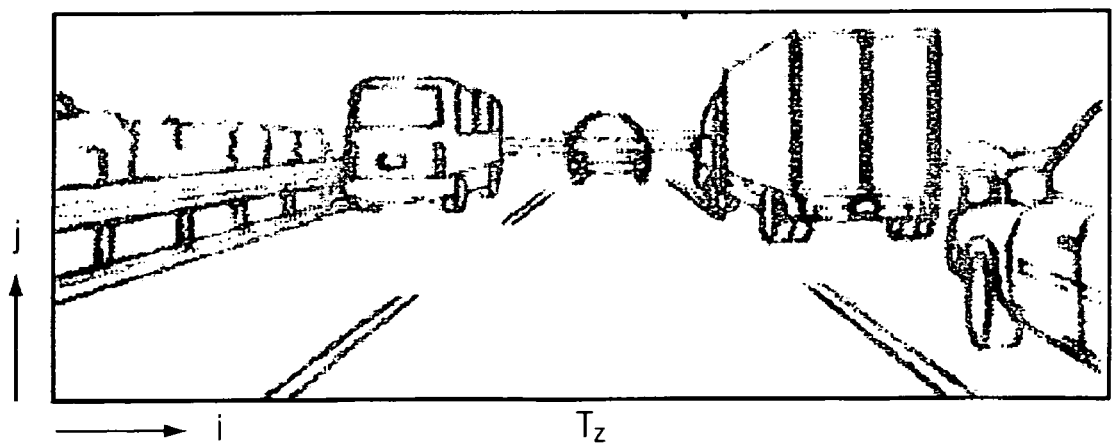
FIG. 4 shows a distance image formed on the basis of the reference image shown in FIG. 3.

Hereinafter, a reference image T in which parallaxes dp are respectively correlated with the reference pixel blocks PB is referred to as a distance image Tz. For example, a distance image Tz shown in FIG. 4 is formed by correlating the parallaxes dp with the reference pixel blocks PB in the reference image T shown in FIG. 3. The image processor 7 stores data on the distance image Tz thus formed in the distance-data memory 8, and also transmits the data to the processing means 9.

The parallax dp, the coordinates (i, j) in the distance image Tz, and the position (X, Y, Z) in real space can be correlated according to the principle of triangulation, as follows. Specifically, the relationship among the point (X, Y, Z) in real space, the parallax dp, and the coordinates (i, j) in the distance image Tz can be given by the following expressions:

$$X = CD/2 + Z \times PW \times (i - IV) \tag{2}$$

$$Y = CH + Z \times PW \times (j - JV) \tag{3}$$

$$Z = CD/(PW \times (dp - DP)) \tag{4}$$

where a point on the road surface just below the midpoint between the main camera 2a and the sub-camera 2b in real space is designated as the origin, the X-axis indicates the width direction, that is, the right-left direction of the subject vehicle, the Y-axis indicates the vehicle height direction, and the Z-axis indicates the vehicle length direction, that is, the distance direction. Further, (i, j, dp) and (X, Y, Z) are correlated in a one-to-one correspondence.

Herein, CD represents the distance between the main camera 2a and the sub-camera 2b, PW represents the viewing angle for one pixel, CH represents the mounting height of the main camera 2a and the sub-camera 2b, IV and JV respectively represent i and j coordinates of the point at infinity in front of the subject vehicle, and DP represents the vanishing point parallax.

As described above, the parallax dp and the distance Z in real space are correlated in a one-to-one correspondence by the above Expression (4). For this reason, while the distance image Tz is formed by correlating the parallaxes dp with the reference pixel blocks PB in the reference image T in this embodiment, the parallaxes dp of the reference pixel blocks PB may be converted into distances Z, and a distance image Tz may be formed by correlating the distances Z with the reference pixel blocks PB in the reference image T.

The processing means 9 (see FIG. 1) is formed by a computer in which a CPU, a ROM, a RAM, an input/output interface, etc. that are not shown are connected to a bus. Sensors Q, such as a vehicle-speed sensor, a yaw-rate sensor, and a steering-angle sensor for measuring the steering angle of the steering wheel, are also connected to the processing means 9. The yaw-rate sensor can be replaced with a device that estimates the yaw rate from the speed of the subject vehicle or the like.

The processing means 9 includes an object detecting means 10, a preceding-vehicle detecting means 11, a smear determining means 12, and a memory (not shown). Further, the processing means 9 may have other means such as a traffic-line detecting means. Necessary data is input from the sensors Q to the means in the processing means 9.

The object detecting means 10 detects objects from the reference image T taken by the stereo-image taking means 2. In this embodiment, the processing in the object detecting means 10 is based on the processing in the vehicle surroundings monitoring apparatus and so on disclosed in the above-described publications. Therefore, the processing will be briefly described below.

Figure 5:
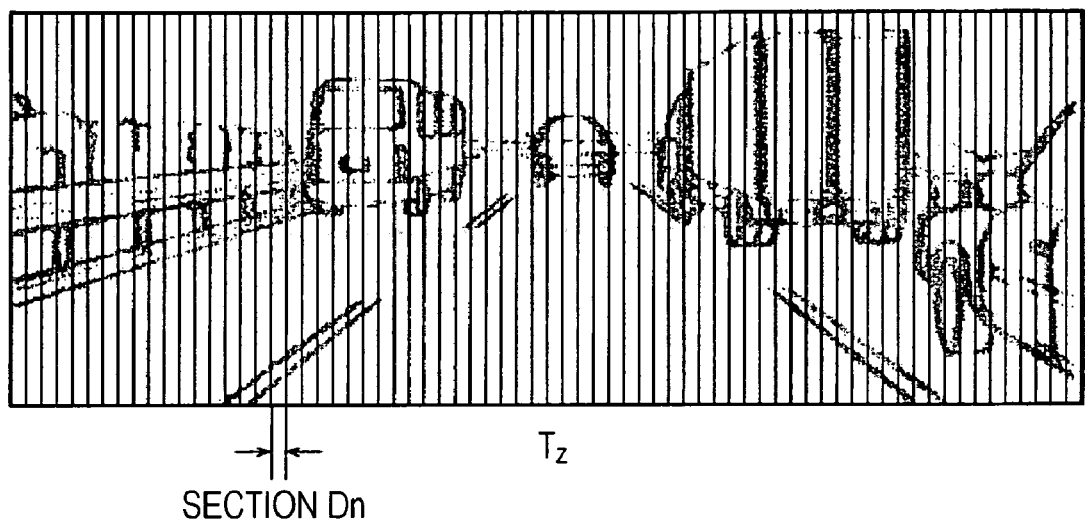
FIG. 5 shows sections of the distance image.
Figure 6:
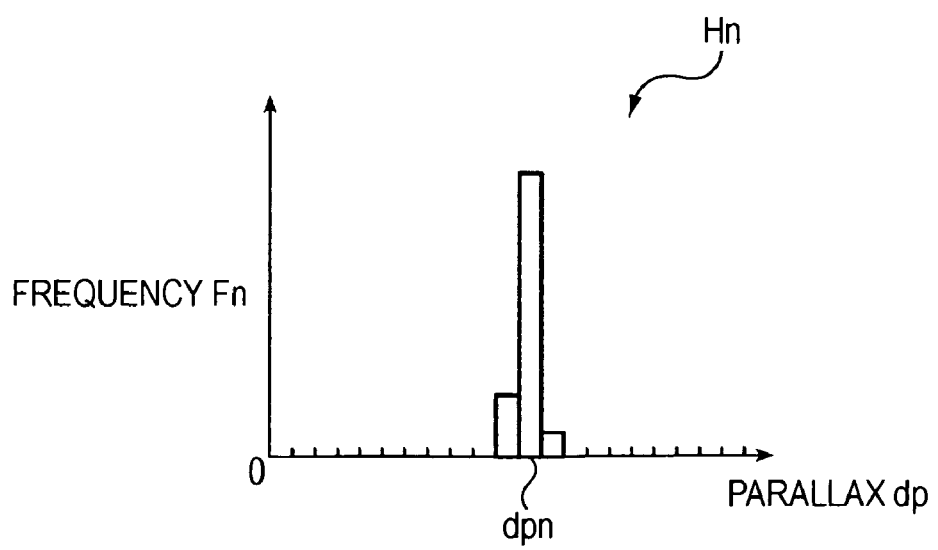
FIG. 6 shows an example of a histogram formed for each of the sections shown in FIG. 5.

For example, the object detecting means 10 divides the distance image Tz shown in FIG. 4 into vertical strip sections Dn each having a predetermined width, as shown in FIG. 5. The object detecting means 10 forms a histogram Hn for each section Dn, as shown in FIG. 6, enters parallaxes dp, which are provided above the road surface, of the parallaxes of the reference pixel blocks PB belonging to the section Dn, into the histogram Hn, and extracts the mode dpn of the histogram Hn as a typical parallax of the section Dn. This operation is performed for all sections Dn.

Figure 7:
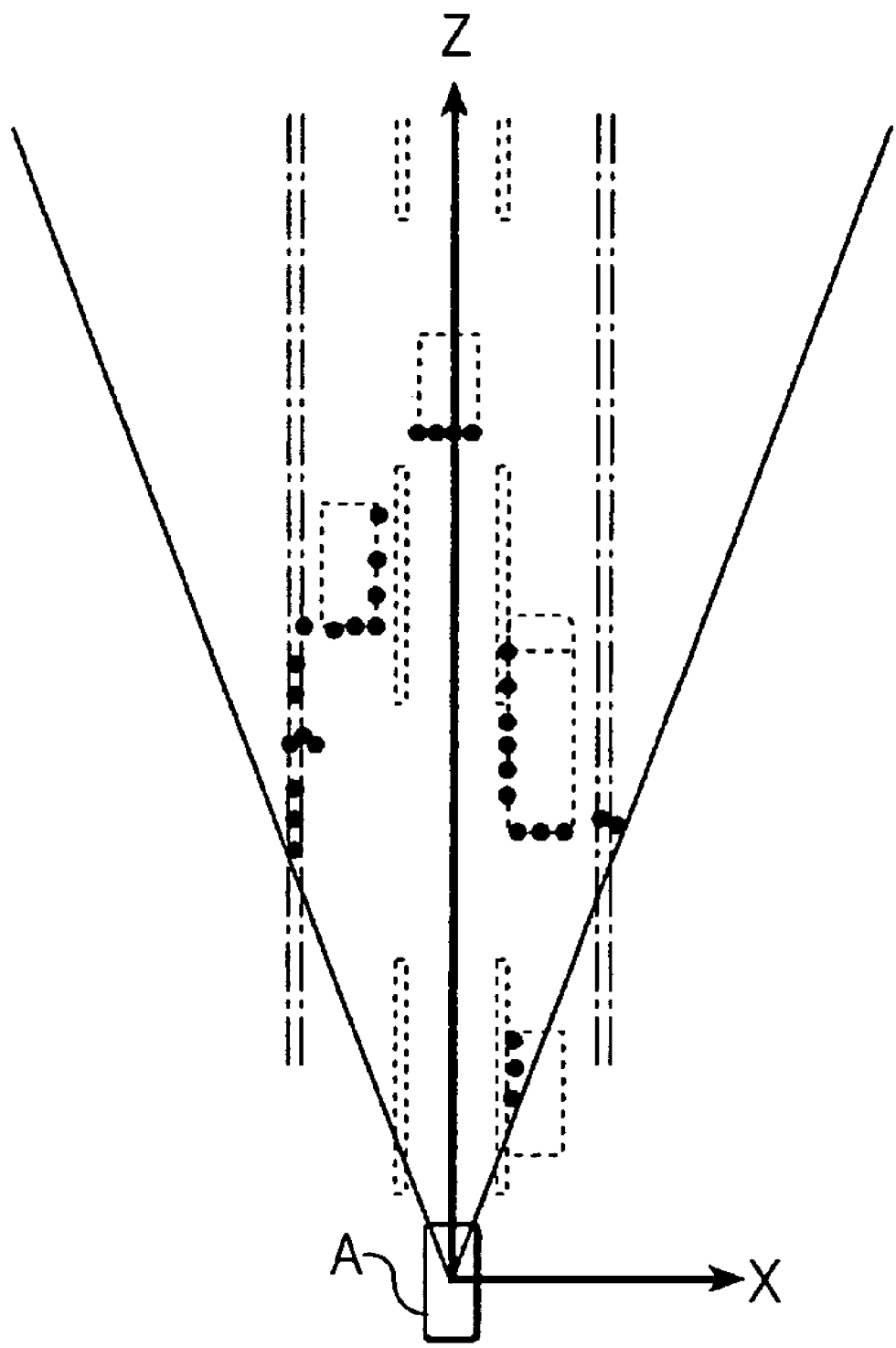
FIG. 7 is a view formed by plotting coordinates in real space based on parallaxes of the sections.

Then, the object detecting means 10 calculates coordinates (X, Y, Z) of objects in real space on the basis of the typical parallaxes of the sections Dn according to Expressions (2) to (4) described above. When the calculated coordinates of the objects are plotted in real space, they are plotted as dots with some variations in portions of forward objects facing a subject vehicle A, as shown in FIG. 7.

Figure 8:
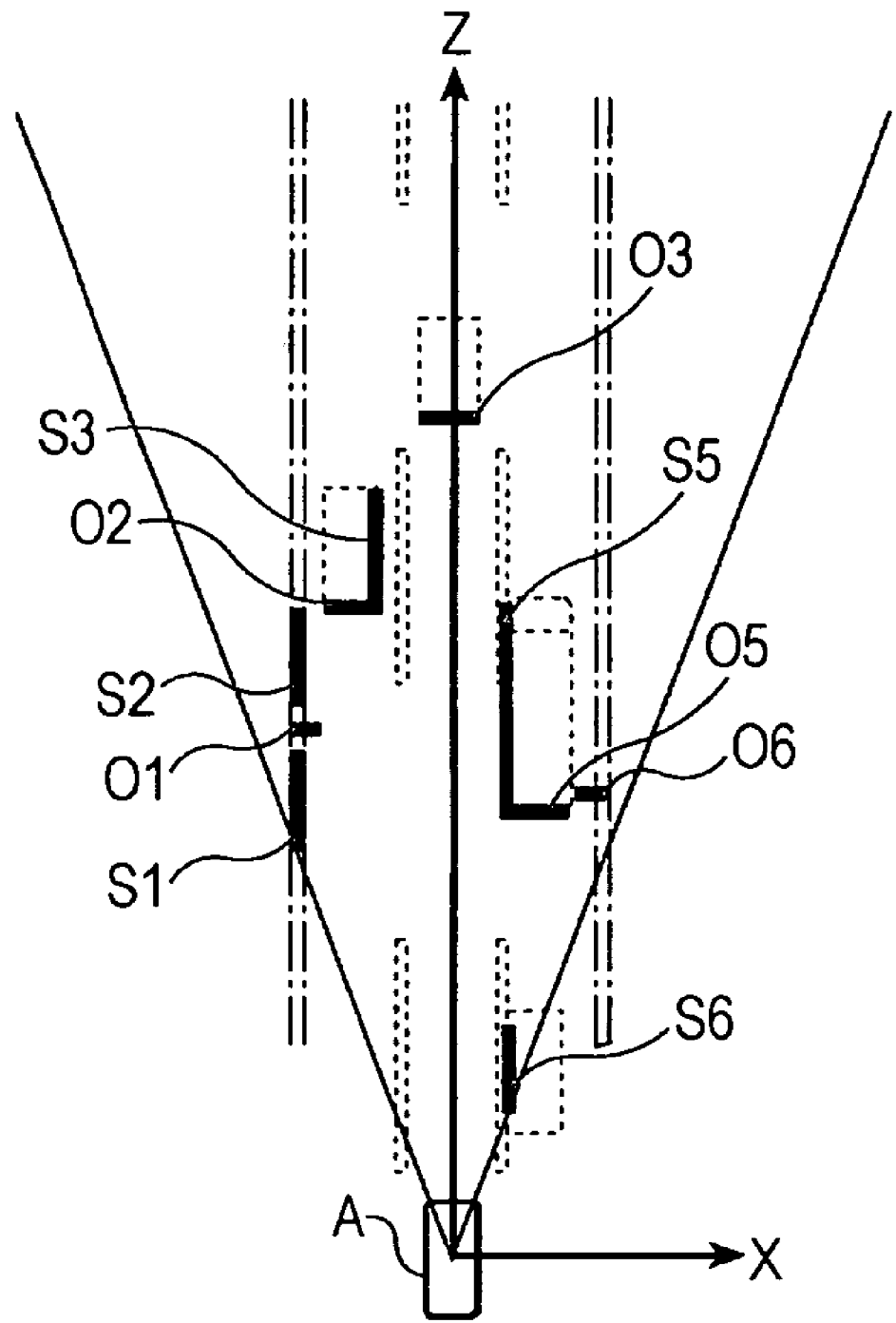
FIG. 8 shows objects detected in real space on the basis of dots shown in FIG. 7.

The object detecting means 10 searches for the distances from each of the dots plotted in real space to the adjacent dots in the X- and Z-axis directions and the total length in the X-axis direction between the leftmost dot to the rightmost dot in each of groups into which the dots are classified. Then, the object detecting means 10 classifies dots having values within set threshold ranges into groups, and subjects the dots in the groups to collinear approximation so as to detect objects, as shown in FIG. 8.

Figure 9:
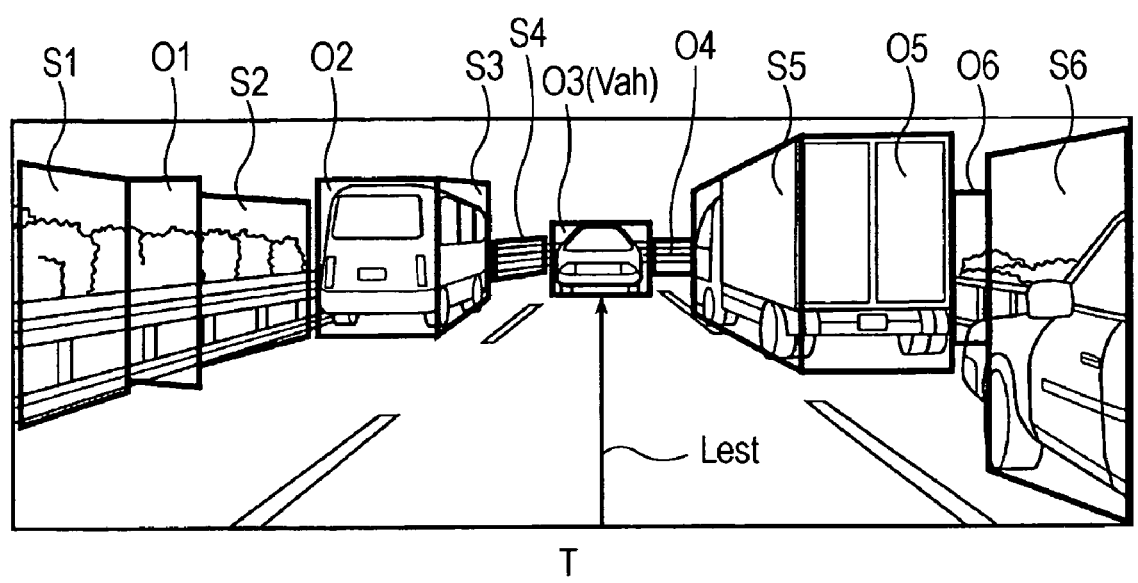
FIG. 9 shows objects and a preceding vehicle that are detected and enclosed by frames in the reference image.

In this embodiment, the objects thus detected by the object detecting means 10 are enclosed by rectangular frames in the reference image T, as shown in FIG. 9. In FIGS. 8 and 9, labels O and S represent the types of faces of the objects facing the subject vehicle A. Label O shows that a rear face of an object is detected, and label S shows that a side face of the object is detected.

The object detecting means 10 stores information about the detected objects in the memory, and outputs the information to the outside, as necessary.

Figure 10:
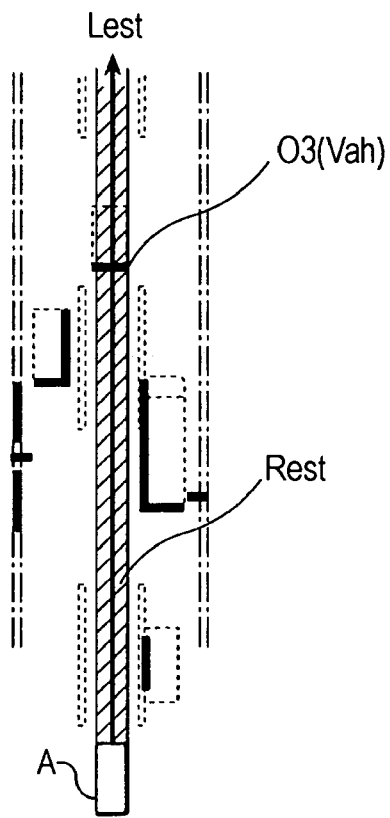
FIG. 10 shows a traveling locus and a traveling path of a subject vehicle, and a preceding vehicle in real space.

The preceding-vehicle detecting means 11 estimates, as a traveling locus Lest, a locus that the subject vehicle A will form during future driving, on the basis of the behavior of the subject vehicle A, as shown in FIG. 10. Then, the preceding-vehicle detecting means 11 calculates, as a traveling path Rest of the subject vehicle A, a region centered on the traveling locus Lest and having a width equal to the width of the subject vehicle A.

The traveling locus Lest of the subject vehicle A can be calculated from a turning curvature Cua of the subject vehicle A. The turning curvature Cua is calculated according to the following expression (5) or expressions (6) and (7) on the basis of the vehicle speed V and the yaw rate γ of the subject vehicle A, the steering angle δ of the steering wheel, etc.:

$$Cua = \gamma/V \tag{5}$$

$$Re = (1 + Asf \cdot V^2) \cdot (Lwb/\delta) \tag{6}$$

$$Cua = 1/Re \tag{7}$$

where Re represents the turning radius, Asf represents the stability factor of the vehicle, and Lwb represents the wheel base.

Then, the preceding-vehicle detecting means 11 detects, as a preceding vehicle Vah traveling in front of the subject vehicle A, an object closest to the subject vehicle A, of objects present on the traveling path Rest of the subject vehicle A. In the example shown in FIGS. 9 and 10, a vehicle O3 is detected as a preceding vehicle Vah.

The preceding-vehicle detecting means 11 stores the distance from the subject vehicle A to the detected preceding vehicle Vah and other necessary information in the memory, and transmits the information to a preceding-vehicle follow-up control apparatus 21 that will be described below.

In this embodiment, the preceding-vehicle detecting means 11 pursues the preceding vehicle Vah with consistency, for example, by calculating the probability that a preceding vehicle detected in the previous sampling period and an object detected as a preceding vehicle in the current sampling period are the same three-dimensional object. Further, the preceding-vehicle detecting means 11 can detect the exchange between preceding vehicles, for example, when a detected preceding vehicle comes out of the front of the subject vehicle and a vehicle in front of the detected preceding vehicle becomes a new preceding vehicle, or when another vehicle cuts in between the subject vehicle and the preceding vehicle so as to become a new preceding vehicle.

While the object detecting means 10 and the preceding-vehicle detecting means 11 are separately described in the above, the object detecting operation of the object detecting means 10 and the preceding-vehicle detecting operation of the preceding-vehicle detecting means 11 are always performed as a series of operation.

In this embodiment, the smear detecting means 12 monitors a condition in which the parallaxes dp of the reference pixel blocks PB belonging to each section Dn of the distance image Tz are entered in a histogram Hn in the object detecting means 10, and monitors the number of entry of parallaxes dp corresponding to long distances including infinity in the histogram Hn.

This is based on the following findings. That is, for example, in the above-described case in which a columnar object that glistens white because of reflection of the sunlight extends through the image from top to bottom, parallaxes dp corresponding to finite distances, such as several meters or several tens of meters, from the subject vehicle are calculated by stereo matching. In contrast, in a case in which a smear is caused in a backlit state, parallaxes dp corresponding to long distances including infinity from the subject vehicle are calculated by stereo matching. This is because the smear reflects the sunlight that can be regarded as being at an infinite distance from the subject vehicle.

When infinity ∞ is substituted for the distance Z in the left side of Expression (4) described above, a parallax dp corresponding to a long distance including infinity from the subject vehicle becomes a vanishing point parallax DP or a value close thereto, as shown by the following expressions:

$$\infty = CD/(PW \times (dp-DP))$$

$$dp-DP = CD/(PW \times \infty) = 0$$

That is:

$$dp = DP$$

From the above, in this embodiment, a long-distance parallax threshold value corresponding to the long distances including infinity is provided for parallaxes dp calculated by stereo matching. For example, the long-distance parallax threshold value is set at a value DP+1 close to the parallax DP corresponding to infinity. Reference pixel blocks PB having parallaxes dp less than or equal to the long-distance parallax threshold value DP+1 are detected as reference pixel blocks PB in which parallaxes dp corresponding to the long distances including infinity are calculated.

When a distance image Tz is formed by correlating information about the distances Z with the reference pixel blocks PB in the reference image T, as described above, a long distance threshold value is set as a threshold value for distances Z that define long distances including infinity, and reference pixel blocks PB having distances Z more than or equal to the long distance threshold value are detected as reference pixel blocks PB in which distances Z corresponding to long distances including infinity are calculated. In this case, the long-distance distance threshold value is set at a distance corresponding to the above-described parallax DP+1 set as the long-distance parallax threshold value.

Figure 11:
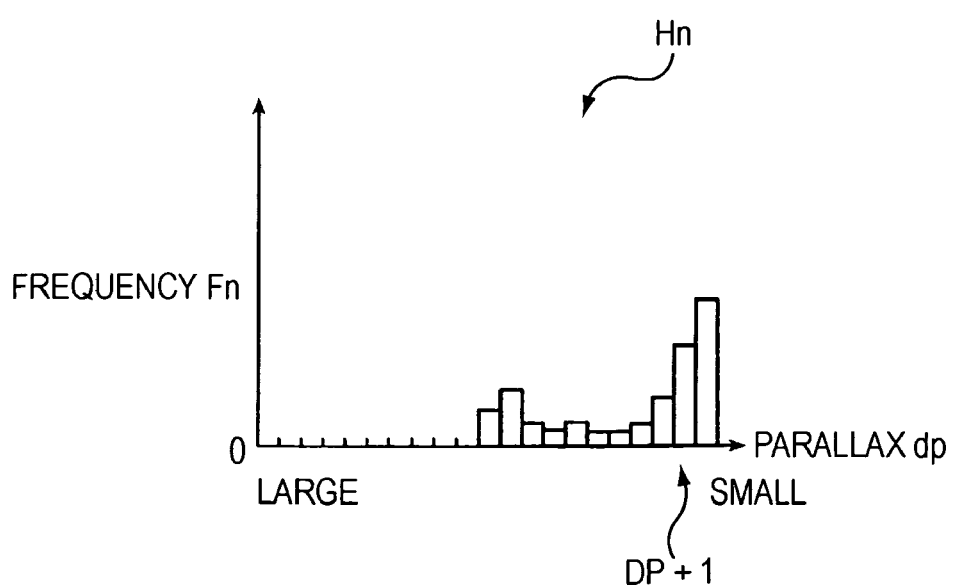
FIG. 11 is an example of a state of entry in a histogram when there is a smear.

More specifically, the smear determining means 12 monitors a condition in which parallaxes dp are entered in each histogram Hn, as shown in FIG. 6, and monitors the number of entry of parallaxes dp that are less than or equal to DP+1 in the histogram Hn, as shown in FIG. 11. When the total number of parallaxes dp entered in this range becomes more than or equal to a predetermined threshold value, the smear determining means 12 sets a section Dn in the distance image Tz corresponding to the histogram Hn as a smear candidate.

It depends on, for example, performance of the CCD image sensors of the stereo-image taking means 2 used in the vehicle environment recognition apparatus 1 what values are set as the long-distance parallax threshold value, the long distance threshold value, and the predetermined threshold value for the total number of entered parallaxes. Therefore, these threshold values are set appropriately.

Figure 12:
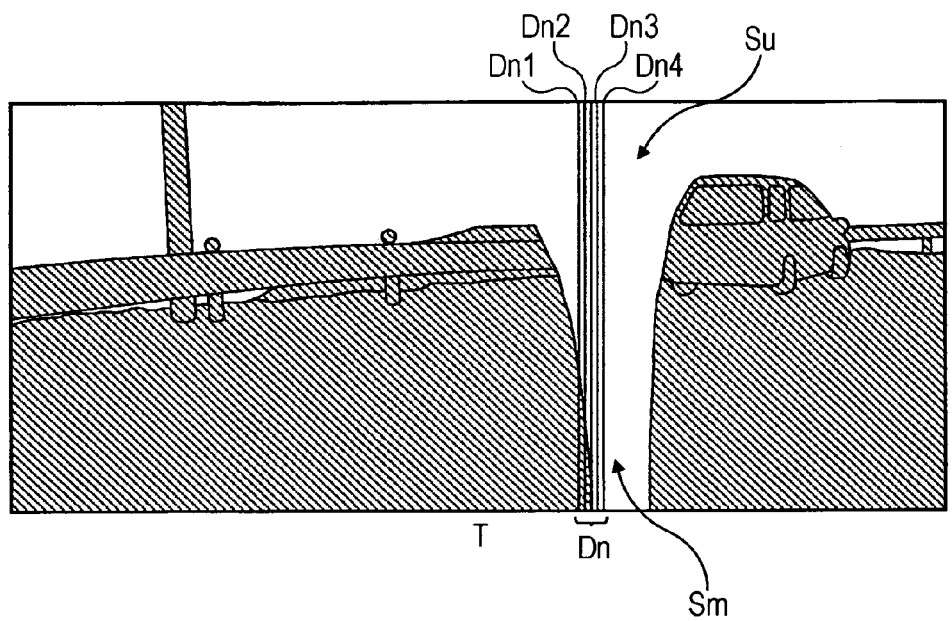
FIG. 12 illustrates pixel columns applied and set in the reference image.

Subsequently, the smear determining means 12 sets a pixel column in a region of the reference image T corresponding to the section Dn in the distance image Tz that satisfies the above-described condition and is set as a smear candidate. When the section Dn in the distance image Tz is defined by a vertically extending pixel column having a width corresponding to four pixels, a pixel column Dn having a width corresponding to four pixels is set in the same position on the reference image T, as shown in FIG. 12. In FIG. 12, the width corresponding to one pixel is shown to be larger than it really is.

It is possible to determine whether or not a smear occurs, for the entire pixel column Dn having a width corresponding to four pixels. However, in this embodiment, the smear determining means 12 determines whether or not a smear occurs in each of pixel columns Dn1 to Dn4 (see FIG. 12) having a width corresponding to one pixel, which are included in the pixel column Dn having a width corresponding to four pixels.

Specifically, the smear determining means 12 searches each of the pixel columns Dn1 to Dn4 for brightnesses p1$ij$ of pixels, and detects whether or not the ratio of the number of high-brightness pixels having brightnesses more than or equal to a predetermined brightness pth to the total number of pixels belonging to the pixel column is more than or equal to a predetermined ratio.

When the brightnesses p1$ij$ of the pixels in the reference image T are set at 0 to 255 levels of gray scale, as described above, the predetermined brightness pth is set at a high value close to the saturated brightness, for example, 240. The above-described predetermined ratio is set, for example, at 75%.

When the above-described condition is satisfied by at least one of the pixel columns Dn1 to Dn4 in the pixel column Dn, the smear determining means 12 determines that a smear occurs.

When the smear determining means 12 thus determines that a smear occurs, it transmits a smear occurrence signal to a preceding-vehicle follow-up control apparatus 21 that will be described below.

Preceding-Vehicle Follow-Up Control System

Figure 13:
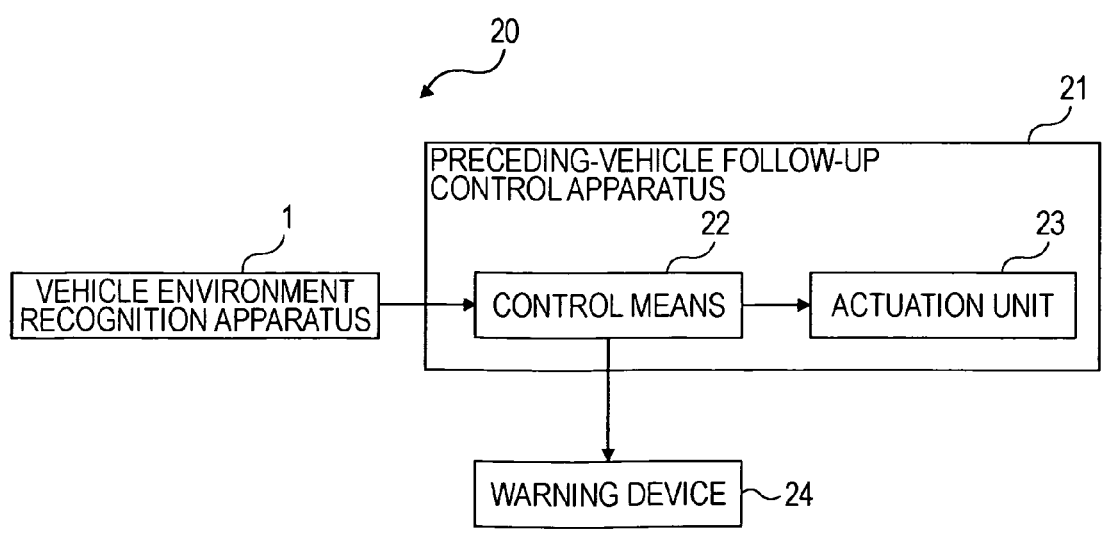
FIG. 13 is a block diagram showing a configuration of a preceding-vehicle follow-up control system according to the embodiment.

Referring to FIG. 13, a preceding-vehicle follow-up control system 20 according to this embodiment includes the above-described vehicle environment recognition apparatus 1, a preceding-vehicle follow-up control apparatus 21, and a warning device 24.

The preceding-vehicle follow-up control apparatus 21 includes a control means 22 formed by a microcomputer or the like, and an actuation unit 23 formed by an actuator that operates an accelerator throttle and a brake mechanism of the subject vehicle according to instructions from the control means 22.

When receiving information about the distance Z between the subject vehicle and the preceding vehicle Vah from the preceding-vehicle detecting means 11 in the vehicle environment recognition apparatus 1, the control means 22 in the preceding-vehicle follow-up control apparatus 21 instructs the actuation unit 23 to cause the subject vehicle to follow the preceding vehicle Vah. In this case, when the subject vehicle and the preceding vehicle Vah are running, the subject vehicle is caused to follow the preceding vehicle Vah while maintaining an inter-vehicle distance therebetween. When the preceding vehicle Vah is stopped, the subject vehicle is stopped at a predetermined distance back from the preceding vehicle Vah.

In this way, the control means 22 performs known preceding-vehicle follow-up control, including the above-described operations, over the subject vehicle according to the information about the preceding vehicle Vah transmitted from the preceding-vehicle detecting means 11 in the vehicle environment recognition apparatus 1.

In contrast, when receiving the above-described smear occurrence signal transmitted from the smear determining means 12 in the vehicle environment recognition apparatus 1, the control means 22 in the preceding-vehicle follow-up 0control apparatus 21 halts preceding-vehicle follow-up control over the subject vehicle.

In this case, there may be a probability that the smear determining means 12 erroneously determines the occurrence of a smear and transmits a smear occurrence signal. Therefore, for example, the control means 22 can halt preceding-vehicle follow-up control over the subject vehicle when smear occurrence signals are continuously transmitted from the smear determining means 12 for a predetermined number of frames (i.e., a predetermined number of sampling periods).

Conversely, there may be a probability that the smear determining means 12 determines that a smear does not occur, although a smear actually occurs in the reference image T. In this case, even when smear occurrence signals have been transmitted continuously, if the transmission of the smear occurrence signals is stopped by the above event before the number of frames reaches the above-described predetermined number, the number of continuous frames is reset. Consequently, preceding-vehicle follow-up control is not halted until the number of frames reaches the predetermined number again, that is, preceding-vehicle follow-up control is not halted at least for a while although a smear occurs.

Figure 14:
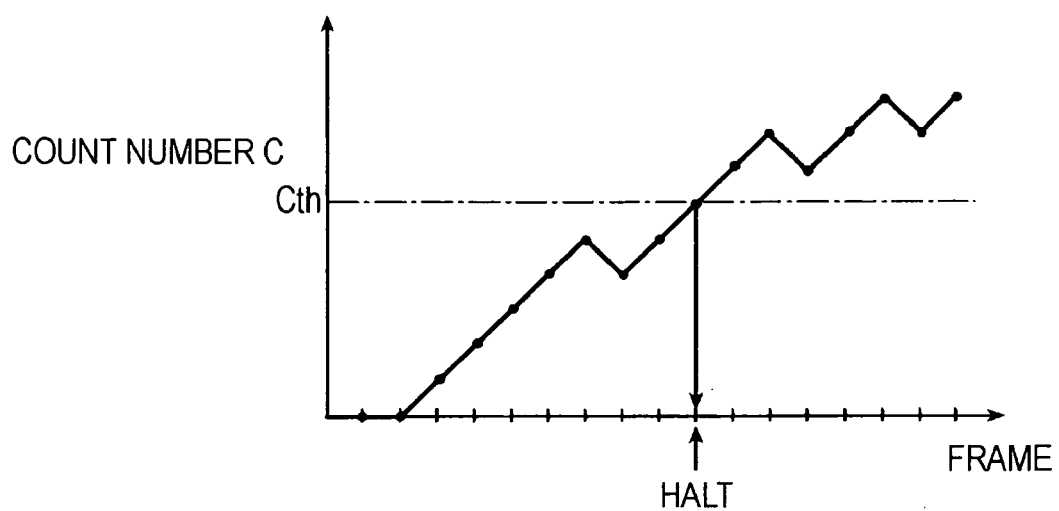
FIG. 14 is a graph showing increases and decreases in the count value of a counter corresponding to frames and a threshold value.

To avoid this situation, this embodiment adopts a counter (not shown) that increases the count number in a frame in which a smear occurrence signal is transmitted and decreases the count number in a frame in which a smear occurrence signal is not transmitted. When the count number C of the counter is more than or equal to a predetermined threshold value Cth, as shown in FIG. 14, the control means 22 halts preceding-vehicle follow-up control over the subject vehicle.

If the driver of the subject vehicle does not notice that preceding-vehicle follow-up control is halted, the driver falsely believes that preceding-vehicle follow-up control is continued, and fails to perform braking. This may cause a collision with the preceding vehicle Vah. For this reason, in this embodiment, when preceding-vehicle follow-up control over the subject vehicle is halted, the control means 22 in the preceding-vehicle follow-up control apparatus 21 warns the driver that preceding-vehicle follow-up control is halted, for example, by emitting sound from a speaker (not shown), displaying a message on a screen (not shown), or lighting a predetermined lamp (not shown) in the warning device 24.

Operation

A description will now be given of the operation of the vehicle environment recognition apparatus 1 and the preceding-vehicle follow-up control system 20 according to this embodiment.

In the vehicle environment recognition apparatus 1, images of a surrounding environment of the subject vehicle are taken by the stereo-image taking means 2 including the main camera 2a and the sub-camera 2b, and stereo matching is performed by the image processor 7 in the stereo matching means 6 on the basis of output reference and comparative images T and Tc.

On the basis of a distance image Tz obtained by stereo matching, objects and a preceding vehicle Vah are detected from the reference image T by the object detecting means 10 and the preceding-vehicle detecting means 11 in the processing means 9. Detection of objects and a preceding vehicle is always performed, regardless of the presence or absence of a smear. Information about the detection is always transmitted to the control means 22 in the preceding-vehicle follow-up control apparatus 21, and to other devices, such as an ECU, as necessary.

The smear determining means 12 monitors a state in which parallaxes dp of reference pixel blocks PB belonging to each of the sections Dn of the distance image Tz set by the object detecting means 10 are entered in a histogram Hn, as described above.

Unless the total number of parallaxes dp entered in the histogram Hn, which are less than or equal to the long-distance parallax threshold value DP+1 corresponding to the long distance including infinity, becomes more than or equal to the predetermined threshold value, no operation is performed. In other words, a smear occurrence signal is not transmitted.

Only when the total number of parallaxes dp entered in the histogram Hn, which are less than or equal to the long-distance parallax threshold value DP+1, becomes more than or equal to the predetermined threshold value, as shown in FIG. 11, the smear determining means 12 sets a section Dn in the distance image Tz corresponding to the histogram Hn as a smear candidate.

Next, the smear determining means 12 sets a pixel column Dn in the same region of the reference image T as the section Dn in the distance image Tz, and searches each of the pixel columns Dn1 to Dn4 in the pixel column Dn (see FIG. 12), which has a width corresponding to one pixel, for brightnesses p1$ij$ of pixels. Then, the smear determining means 12 determines whether or not the ratio of the number of high-brightness pixels having brightnesses more than or equal to the predetermined threshold value pth to the total number of pixels belonging to the pixel column having a width corresponding to one pixel is more than or equal to the predetermined threshold value.

When the above-described condition is satisfied by at least one of the pixel columns Dn1 to Dn4 in the pixel column Dn, the smear determining means 12 determines that a smear occurs, and transmits a smear occurrence signal to the control means 22 in the preceding-vehicle follow-up control apparatus 21.

In this way, the smear determining means 12 simply monitors the state of entry into the histogram Hn in a normal state, that is, in a state in which there is no smear. Only in a state in which there is a probability that a smear occurs, that is, only when the number of parallaxes dp entered in the histogram Hn, which are less than or equal to the long-distance parallax threshold value corresponding to the long distance including infinity, is increased, the smear determining means 12 searches only the pixel column Dn set in the reference image T for brightnesses p1$ji$ of pixels.

Figure 15:
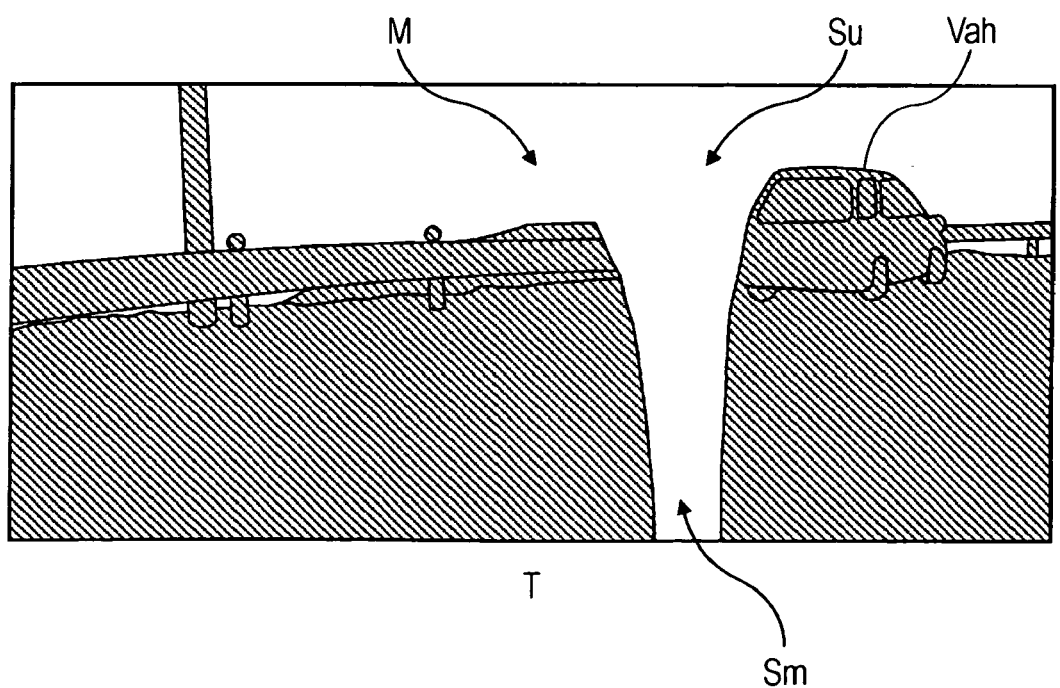
FIG. 15 shows an example of an image in which a smear appears.

While the smears Sm are thick and large in FIGS. 12 and 15, a smear sometimes has a width corresponding to one pixel or about two or three pixels in the reference image T. Further, a smear is characterized in being shaped like a straight line having almost the same width as that of light of the object and in extending through the image from top to bottom. Upper wide portions of the smears Sm in FIGS. 12 and 15 show flare (halation) caused by a significantly intense light of the sun Su.

Therefore, the presence or absence of a smear can be sufficiently reliably determined by searching the pixel column Dn vertically extending in the reference image T or the pixel columns Dn1 to Dn4 in the pixel column Dn each having a width corresponding to one pixel, for brightnesses p1$ij$ of pixels, as in this embodiment.

When the above-described smear occurrence signal is transmitted from the smear determining means 12 in the vehicle environment recognition apparatus 1, the preceding-vehicle follow-up control apparatus 21 in the preceding-vehicle follow-up control system 20 halts preceding-vehicle follow-up control over the subject vehicle.

In this case, when it is determined that smears occur in several continuous frames or when the count number C of frames judged as including a smear is increased or decreased and becomes more than or equal to the predetermined threshold value Cth, preceding-vehicle follow-up control over the subject vehicle is halted. This allows preceding-vehicle follow-up control over the subject vehicle to be halted after the determination of the smear determining means 12 in the vehicle environment recognition apparatus 1 on the occurrence of a smear is checked sufficiently.

Advantages

As described above, according to the vehicle environment recognition apparatus 1 of this embodiment, the smear determining means 12 determines whether or not a smear occurs in the pixel column Dn (or pixel columns Dn1 to Dn4) vertically extending in the reference image T including the reference pixel blocks PB in which distances Z more than or equal to the long distance threshold value corresponding to the long distance including infinity or parallaxes dp less than or equal to the long-distance parallax threshold value corresponding to the long distance threshold value are calculated by stereo matching.

For this reason, for example, in the above-described case in which a columnar object that glistens white because of reflection of the sunlight extends through the image from top to bottom, a parallax dp corresponding to the long distance including infinity is not calculated for the object by stereo matching. Therefore, the smear determining means 12 can reliably prevent this object from being erroneously judged as a smear, and can reliably determine the occurrence of the smear.

Because of the above-described characteristics of the smear appearing on the image, a determination of the occurrence of the smear is made for the pixel column Dn (or pixel columns Dn1 to Dn4) vertically extending in the reference image T, which includes the reference pixel blocks PB in which values corresponding to the long distance including infinity are calculated. This makes it possible to sufficiently reliably determine whether or not a smear occurs.

Only when values corresponding to the long distance including infinity are calculated as parallaxes dp (or distances Z) of the reference pixel blocks PB by stereo matching, the smear determining means 12 determines whether or not a smear occurs. Further, the smear determining means 12 searches only the pixel column in the reference image T to which the reference pixel blocks PB belong, for brightnesses of pixels.

Hence, compared with a case in which the entire reference image T or the monitor region in the reference image T is constantly monitored, the burden on the operation of determining the occurrence of a smear is considerably reduced, and the operation is simplified. Moreover, the operation time can be reduced.

According to the preceding-vehicle follow-up control system 20 of this embodiment, when a smear occurs, a smear occurrence signal is reliably transmitted from the smear determining means 12 in the vehicle environment recognition apparatus 1, which can reliably determine the occurrence of the smear, as described above. Therefore, when a smear occurs, preceding-vehicle follow-up control can be properly halted according to the signal.

In this case, when it is determined that smears occur in several continuous frames or when the count number C of frames judged as including a smear is increased or decreased and becomes more than or equal to the predetermined threshold value Cth, preceding-vehicle follow-up control over the subject vehicle is halted. Therefore, even if the smear determining means 12 in the vehicle environment recognition apparatus 1 erroneously determines the occurrence of a smear, it is possible to properly cope with the determination of the smear determining means 12 by halting preceding-vehicle follow-up control over the subject vehicle after sufficiently checking the determination.

In an upper portion of the reference image T or the comparative image Tc, an image of an object present higher than a vehicle in front of the subject vehicle is included. For this reason, even when a smear does not occur, a value corresponding to the long distance including infinity is sometimes calculated as a parallax dp (or a distance Z) by stereo matching in a reference pixel block PB in the upper portion of the reference image T. On the other hand, a smear is characterized in extending through the image from top to bottom, as described above.

To avoid the adverse effect of the upper portion of the reference image T, when the smear determining means 12 in the vehicle environment recognition apparatus 1 searches the pixel column Dn or pixel columns Dn1 to Dn4 set in the reference image T for brightnesses p1$ij$ of pixels, it searches a predetermined number of (e.g., 80% of the total number of pixels in the vertical direction) pixels upward from the lowermost pixel in the pixel column in the reference image T, but does not search for brightnesses p1$ij$ of upper pixels. When the ratio of the number of pixels, which have brightnesses more than or equal to the brightness pth set at, for example, 240, to the predetermined number of pixels is more than a predetermined ratio (e.g., 90%), it can be determined that a smear occurs.

What is claimed is:

1. A vehicle environment recognition apparatus comprising:
   stereo-image taking means for taking and outputting a reference image and a comparative image of a surrounding environment of a subject vehicle with a pair of cameras;
   stereo matching means for dividing the reference image into pixel blocks each having a predetermined number of pixels, subjecting each of the pixel blocks to stereo matching with the comparative image, and correlating a calculated parallax or distance with the pixel block in the reference image;
   preceding-vehicle detecting means for detecting a preceding vehicle from the reference image on the basis of the parallax or distance calculated by the stereo matching means; and
   smear determining means for searching a pixel column vertically extending in the reference image for brightnesses of pixels, the pixel column including a pixel block having, as the distance, a distance more than or equal to a long distance threshold value including infinity or having, as the parallax, a parallax less than or equal to a long-distance parallax threshold value corresponding to the long distance threshold value, and for determining that a smear occurs when a ratio of the number of pixels having brightnesses more than or equal to a predetermined brightness to the total number of pixels belonging to the pixel column is more than or equal to a predetermined ratio.

2. The vehicle environment recognition apparatus according to claim 1, wherein, when the pixel column includes a plurality of pixel columns vertically extending in the reference image and each having a width corresponding to one pixel, the smear determining means conducts the search on each of the pixel columns, and determines that a smear occurs when the ratio of the number of pixels having brightnesses more than or equal to the predetermined brightness in at least one of the pixel columns to the total number of pixels belonging to the pixel column is more than or equal to the predetermined ratio.

3. The vehicle environment recognition apparatus according to claim 1, wherein the smear determining means searches a predetermined number of pixels upward from the lowermost pixel of the pixel column in the reference image for the brightnesses of the pixels, and determines that a smear occurs when the ratio of the number of pixels having brightnesses more than or equal to the predetermined brightness to the predetermined number of pixels is more than or equal to a predetermined ratio.

4. The vehicle environment recognition apparatus according to claim 1,
   wherein the preceding-vehicle detecting means divides, into a plurality of vertical sections, the reference image in which the parallax or the distance is correlated with each of the pixel blocks by the stereo matching means, forms a histogram for the section, extracts a typical parallax or a typical distance by entering the parallaxes or distances of the pixel blocks belonging to the section into the histogram, and detects the preceding vehicle on the basis of the typical parallax or the typical distance of the section, and
   wherein the smear determining means monitors a result of entry into the histogram of each of the sections, and conducts the search on a section in which the number of entered distances more than or equal to the long distance threshold value or parallaxes less than or equal to the long-distance parallax threshold value is more than or equal to a predetermined threshold value in the histogram.

5. A preceding-vehicle follow-up control system comprising:
   the vehicle environment recognition apparatus according to claim 1; and
   a preceding-vehicle follow-up control apparatus that performs preceding-vehicle follow-up control over the subject vehicle on the basis of information about the preceding vehicle detected by the preceding-vehicle detecting means,
   wherein the preceding-vehicle follow-up control apparatus halts the preceding-vehicle follow-up control over the subject vehicle when the smear determining means in the vehicle environment recognition apparatus determines that a smear occurs.

6. The preceding-vehicle follow-up control system according to claim 5, wherein the preceding-vehicle follow-up control apparatus halts the preceding-vehicle follow-up control over the subject vehicle when the smear determining means determines that smears occur in a predetermined number of continuous frames.

7. The preceding-vehicle follow-up control system according to claim 5,
   wherein the preceding-vehicle follow-up control apparatus includes a counter that increases the count number in a frame that is judged as including a smear by the smear determining means and decreases the count number in a frame that is not judged as including a smear by the smear determining means, and
   wherein the preceding-vehicle follow-up control apparatus halts the preceding-vehicle follow-up control over the subject vehicle when the count number of the counter is more than or equal to a predetermined threshold value.

8. The preceding-vehicle follow-up control system according to claim 5, wherein, when the preceding-vehicle follow-up control over the subject vehicle is halted, the preceding-vehicle follow-up control apparatus warns a driver of the subject vehicle that the preceding-vehicle follow-up control is halted.

* * * * *